US008835542B2

(12) United States Patent
Connor et al.

(10) Patent No.: US 8,835,542 B2
(45) Date of Patent: Sep. 16, 2014

(54) NUCLEATING AGENT AND THERMOPLASTIC COMPOSITIONS COMPRISING THE SAME

(75) Inventors: Daniel M. Connor, Richmond, VA (US); Jason D. Sprinkle, Woodruff, SC (US); Darin L. Dotson, Moore, SC (US); Daike Wang, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 9 days.

(21) Appl. No.: 13/266,331

(22) PCT Filed: Feb. 25, 2010

(86) PCT No.: PCT/US2010/000563
§ 371 (c)(1),
(2), (4) Date: Oct. 26, 2011

(87) PCT Pub. No.: WO2010/126559
PCT Pub. Date: Nov. 4, 2010

(65) Prior Publication Data
US 2012/0043692 A1 Feb. 23, 2012

Related U.S. Application Data

(60) Provisional application No. 61/174,242, filed on Apr. 30, 2009.

(51) Int. Cl.
*C08K 5/00* (2006.01)
(52) U.S. Cl.
USPC .......................................................... 524/132
(58) Field of Classification Search
CPC ............................ C08K 5/0083; C08K 5/5317
USPC .......................................................... 524/132
See application file for complete search history.

(56) References Cited

U.S. PATENT DOCUMENTS

| 3,997,503 | A | 12/1976 | Henman et al. |
| 4,075,163 | A | 2/1978 | Hofer et al. |
| 4,200,707 | A | 4/1980 | Richardson |
| 4,232,146 | A | 11/1980 | Di Giacomo et al. |
| 4,258,142 | A | 3/1981 | Ohzeki et al. |

(Continued)

FOREIGN PATENT DOCUMENTS

| EP | 1 736 510 A1 | 12/2006 |
| EP | 2 067 822 A1 | 6/2009 |

(Continued)

OTHER PUBLICATIONS

Ferreira, R. et al. *New J. Chem.* 2004, 28, 1506-1513.

(Continued)

*Primary Examiner* — Alison Hindenlang
(74) *Attorney, Agent, or Firm* — Robert M. Lanning

(57) ABSTRACT

A composition comprises a thermoplastic and a nucleating agent. The thermoplastic can be a polyolefin selected from the group consisting of polypropylene homopolymers, polypropylene copolymers, polyethylene, polyethylene copolymers, polybutylene, poly(4 methyl 1 pentene) and mixtures thereof. The nucleating agent can comprise a metal salt of a phenylphosphonic acid. The nucleating agent can comprise primary particles having a mean aspect ratio of about two or more. The composition can also comprise an acid scavenger, such as one or more metal salts of stearic acid. The composition can be used to produce thermoplastic articles using, for example, injection molding and thermoforming techniques.

19 Claims, 3 Drawing Sheets

(56) References Cited

U.S. PATENT DOCUMENTS

| | | | |
|---|---|---|---|
| 4,291,093 A | 9/1981 | Wishman et al. | |
| 4,463,113 A | 7/1984 | Nakahara et al. | |
| 4,759,971 A | 7/1988 | Weissberger et al. | |
| 5,342,869 A | 8/1994 | Stoll et al. | |
| 5,891,226 A | 4/1999 | Kleiner et al. | |
| 7,199,172 B2 | 4/2007 | Rule | |
| 2002/0096797 A1* | 7/2002 | Stoffelsma et al. | 264/45.9 |
| 2004/0220311 A1 | 11/2004 | Dotson et al. | |
| 2007/0036960 A1 | 2/2007 | Lambert et al. | |
| 2007/0213439 A1* | 9/2007 | Wolters et al. | 524/321 |

FOREIGN PATENT DOCUMENTS

| | | |
|---|---|---|
| JP | 46-21939 B | 6/1971 |
| JP | 57-185341 A | 11/1982 |
| JP | 58-49747 A | 3/1983 |
| JP | 1-284552 A | 11/1989 |
| JP | 2001059040 A * | 3/2001 |
| WO | WO 2005/097894 A1 | 10/2005 |
| WO | WO 2008/044796 A1 | 4/2008 |

OTHER PUBLICATIONS

International Search of PCT/US2010/000563.

* cited by examiner

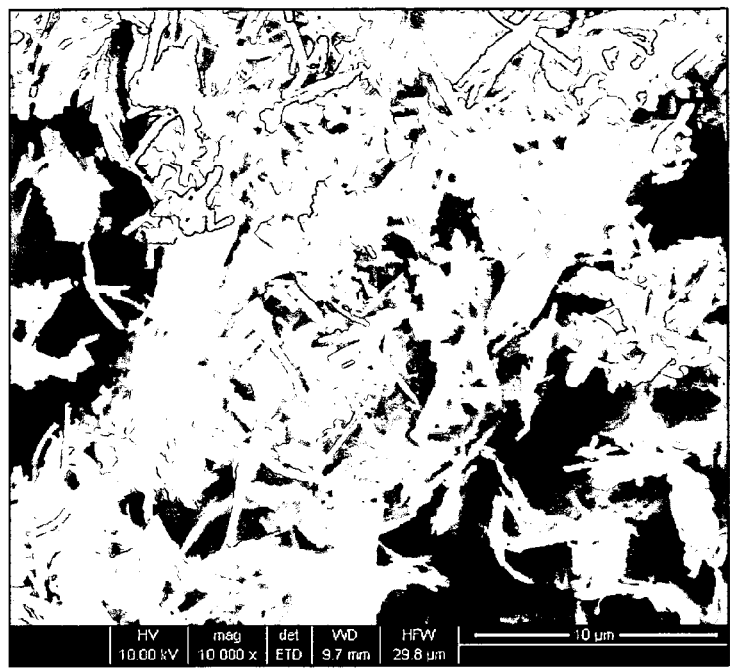
FIG. -1-
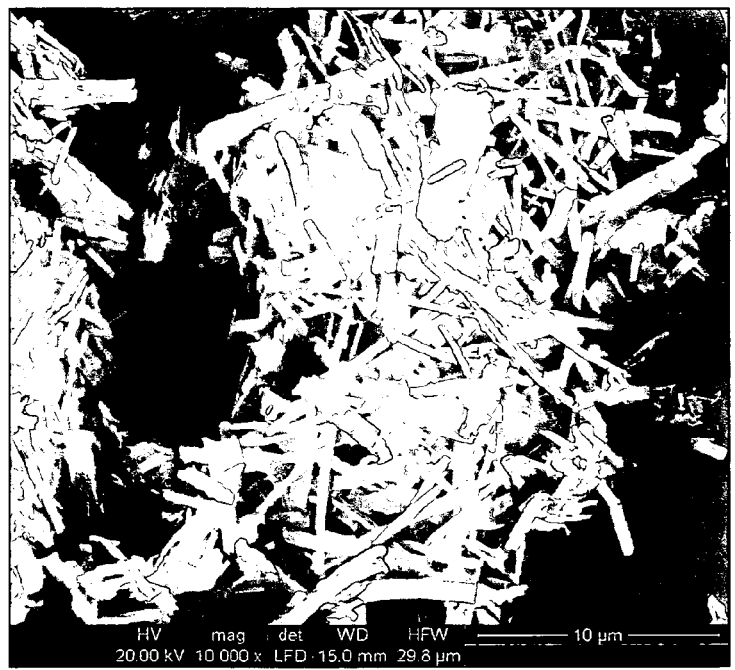
FIG. -2-

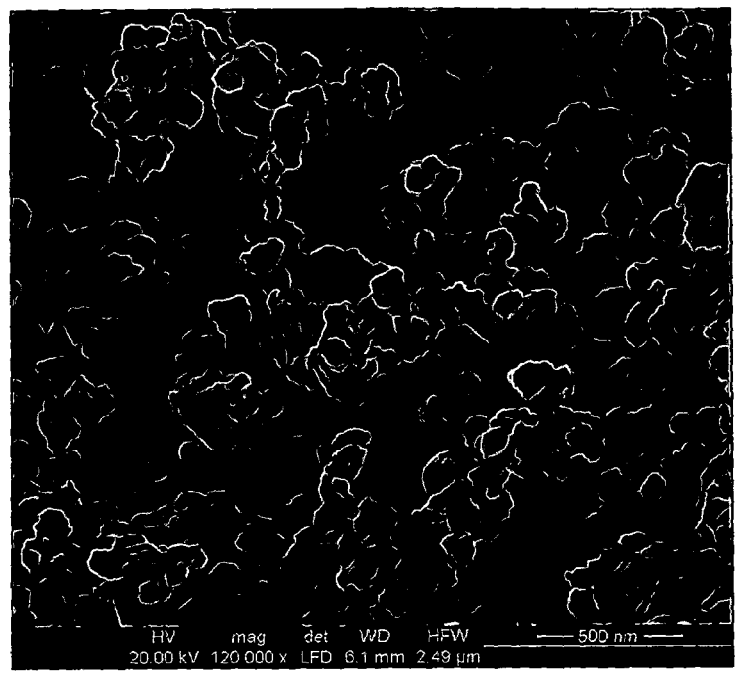
FIG. -3-
FIG. -4-

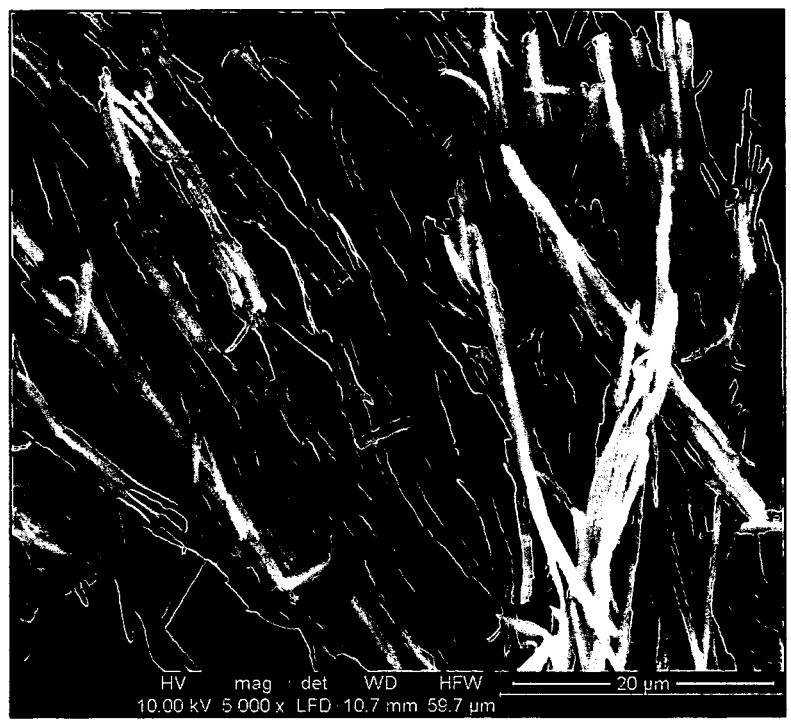
FIG. -5-

US 8,835,542 B2

NUCLEATING AGENT AND THERMOPLASTIC COMPOSITIONS COMPRISING THE SAME

CROSS REFERENCE TO RELATED APPLICATIONS

This application is a national stage of International Patent Application No. PCT/US2010/000563 filed on Feb. 25, 2010, and, pursuant to 35 U.S.C. §119(e)(1), claims priority to and the benefit of the filing date of U.S. Patent Application No. 61/174,242 filed on Apr. 30, 2009, which application is hereby incorporated by reference in its entirety.

TECHNICAL FIELD OF THE INVENTION

This application relates to additives for thermoplastic materials. In particular, the application relates to additives that function as nucleating agents for thermoplastic materials, including polyolefins such as polypropylene and polyethylene.

BRIEF SUMMARY OF THE INVENTION

In one embodiment, the invention provides a composition comprising a thermoplastic and a nucleating agent. The thermoplastic can be a polyolefin selected from the group consisting of polypropylene homopolymers, polypropylene copolymers, polyethylene, polyethylene copolymers, polybutylene, poly(4-methyl-1-pentene) and mixtures thereof. The nucleating agent can comprise a metal salt of a phenylphosphonic acid. The nucleating agent can comprise primary particles having a mean aspect ratio of about two or more.

In another embodiment, the invention provides a composition comprising a thermoplastic, a nucleating agent, and an acid scavenger. The thermoplastic can be a polyolefin selected from the group consisting of polypropylene homopolymers, polypropylene copolymers, polyethylene, polyethylene copolymers, polybutylene, poly(4-methyl-1-pentene) and mixtures thereof. The nucleating agent can comprise a metal salt of a phenylphosphonic acid. The acid scavenger can be selected from the group consisting of metal salts of stearic acid.

The invention also provides methods for producing thermoplastic articles. In one embodiment, the invention provides a method comprising the steps of (a) providing a thermoplastic composition comprising a thermoplastic and a nucleating agent; (b) heating the thermoplastic composition to a temperature sufficient to melt the thermoplastic composition; (c) extruding the thermoplastic composition into a sheet; (d) cooling the sheet produced in step (c) to a temperature sufficient to at least partially solidify the thermoplastic composition; (e) optionally, reheating the sheet to a temperature sufficient to soften the thermoplastic composition; (f) placing the sheet onto a mold having a shape, the shape defining at least a portion of the thermoplastic article; (g) subjecting the sheet to one or more forces sufficient to cause the sheet to conform to the shape of the mold; and (h) cooling the sheet to a temperature sufficient to solidify the thermoplastic composition. The polyolefin can be selected from the group consisting of polypropylene homopolymers, polypropylene copolymers, polyethylene, polyethylene copolymers, polybutylene, poly(4-methyl-1-pentene) and mixtures thereof, and the nucleating agent can comprise a metal salt of a phenylphosphonic acid.

In another embodiment, the invention provides a method for producing a thermoplastic article comprising the steps of (a) providing a thermoplastic composition comprising a thermoplastic and a nucleating agent; (b) providing a mold cavity, the mold cavity defining at least a portion of the thermoplastic article; (c) heating the thermoplastic composition to a temperature sufficient to melt the thermoplastic composition; (d) injecting the thermoplastic composition into the mold cavity; (e) cooling the thermoplastic composition to a temperature sufficient to at least partially solidify the thermoplastic composition; and (f) removing the resulting thermoplastic article from the mold cavity. The polyolefin can be selected from the group consisting of polypropylene homopolymers, polypropylene copolymers, polyethylene, polyethylene copolymers, polybutylene, poly(4-methyl-1-pentene) and mixtures thereof, and the nucleating agent can comprise a metal salt of a phenylphosphonic acid.

BRIEF DESCRIPTION OF THE DRAWINGS

FIG. 1 is a scanning electron micrograph (10,000× magnification) showing the primary particles of the calcium phenylphosphonate monohydrate produced in Example 1.

FIG. 2 is a scanning electron micrograph (10,000× magnification) showing the primary particles of the anhydrous calcium phenylphosphonate produced in Example 2.

FIG. 3 is a scanning electron micrograph (120,000× magnification) showing the primary particles of the calcium phenylphosphonate monohydrate produced in Example 3.

FIG. 4 is a scanning electron micrograph (2,000× magnification) showing the primary particles of the calcium phenylphosphonate monohydrate produced in Example 11.

FIG. 5 is a scanning electron micrograph (5,000× magnification) showing the primary particles of the calcium phenylphosphonate monohydrate produced in Example 11.

DETAILED DESCRIPTION OF THE INVENTION

In a first embodiment, the invention provides a composition comprising a thermoplastic and a nucleating agent comprising a metal salt of a phenylphosphonic acid. The compositions are believed to exhibit improved stiffness, heat deflection temperature, cycle time, shrinkage behavior, haze, clarity, strength, and impact resistance relative to compositions that do not contain the aforementioned nucleating agent.

The thermoplastic present in the composition of the invention can be any suitable thermoplastic material. For example, the thermoplastic can be a polyolefin, such as polypropylene, polyethylene, polyethylene, polybutylene, and poly(4-methyl-1-pentene). In a possibly preferred embodiment, the thermoplastic is a polyolefin selected from the group consisting of polypropylene homopolymers, polypropylene copolymers, polyethylene, polyethylene copolymers, polybutylene, poly(4-methyl-1-pentene) and mixtures thereof. The polypropylene copolymers suitable for use in the composition include polypropylene block copolymers (e.g., impact copolymer) and polypropylene random copolymers. The polypropylene copolymers can be copolymers of ethylene and propylene. The polyethylene present in the composition can be any suitable polyethylene, including linear low-density polyethylene, low-density polyethylene, and high-density polyethylene. In a possibly preferred embodiment, the thermoplastic comprises polypropylene (e.g., polypropylene homopolymer or polypropylene copolymer).

The nucleating agent present in the composition of the invention can be a metal salt of a substituted phenylphosphonic acid, an unsubstituted phenylphosphonic acid, or a mixture of such acids. The phenylphosphonic acid can be any suitable substituted or unsubstituted phenylphosphonic acid. Suitable phenylphosphonic acids include, but are not limited to, those acids conforming to the structure of Formula (I)

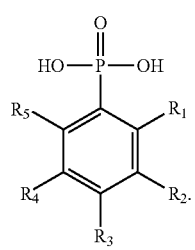
(I)

In the structure of Formula (I), $R_1$, $R_2$, $R_3$, $R_4$, and $R_5$ can be any suitable substituents. For example, $R_1$, $R_2$, $R_3$, $R_4$, and $R_5$ can be substituents independently selected from the group consisting of hydrogen, $C_1$-$C_8$ alkyl groups, $C_1$-$C_8$ alkoxy groups, aryl groups (e.g., phenyl groups), and halogens. In certain possibly preferred embodiments, $R_1$ and $R_5$ are each hydrogen, and $R_2$, $R_3$, and $R_4$ are substituents independently selected from the group consisting of hydrogen, $C_1$-$C_8$ alkyl groups, $C_1$-$C_8$ alkoxy groups, aryl groups (e.g., phenyl groups), and halogens.

The metal salt can comprise any suitable metal cation or combination of metal cations. The metal cation(s) can be, for example, selected from the group consisting of monovalent, divalent, trivalent, and tetravalent metal cations. For example, the metal cation can be a cation of an alkali metal (e.g., lithium, sodium, or potassium), an alkaline earth metal (e.g., magnesium, calcium, strontium, or barium), a transition metal (e.g., zinc, copper, titanium, iron, cobalt, or zirconium), a lanthanide (e.g., lanthanum or cerium), or a poor metal (e.g., aluminum or tin). As utilized herein, the term "transition metal" is used to refer those elements in the d-block of the periodic table of elements, which corresponds to groups 3 to 12 on the periodic table of elements. As utilized herein, the term "poor metal" is used to refer to the metallic elements in the p-block of the periodic table of elements, such as aluminum, gallium, indium, tin, thallium, lead, and bismuth.

In a possibly preferred embodiment, the metal salt of the phosphonic acid conforms to the structure of Formula (II) below

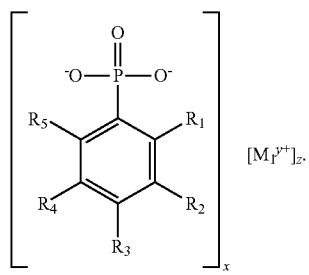
(II)

In the structure of Formula (II), x is a positive integer. $R_1$, $R_2$, $R_3$, $R_4$, and $R_5$ are substituents independently selected from the group consisting of hydrogen, $C_1$-$C_8$ alkyl groups, $C_1$-$C_8$ alkoxy groups, aryl groups (e.g., phenyl groups), and halogens. The variable z is a positive integer, and $M_1$ (or each $M_1$ if z is two or greater) is a metal cation. The variable y is the valence of the metal cation $M_1$. The values of x, y, and z satisfy the following equation 2x=yz.

In certain possibly preferred embodiments of the salt conforming to the structure of Formula (II), $R_1$ and $R_5$ are each hydrogen, and $R_2$, $R_3$, and $R_4$ are substituents independently selected from the group consisting of hydrogen, $C_1$-$C_8$ alkyl groups, $C_1$-$C_8$ alkoxy groups, aryl groups (e.g., phenyl groups), and halogens. Preferably, each $M_1$ is a metal cation independently selected from the group consisting of alkali metal cations (e.g., lithium, sodium, or potassium), alkaline earth metal cations (e.g., magnesium, calcium, strontium, or barium), transition metal cations (e.g., zinc, copper, titanium, iron, cobalt, or zirconium), lanthanide cations (e.g., lanthanum or cerium), and poor metal cations (e.g., aluminum or tin). In certain possibly preferred embodiments, $M_1$ is selected from the group consisting of monovalent and divalent metal cations (e.g., a calcium cation). When the valence of one of the metal cations is an odd integer (e.g., y is 1), each $M_1$ can be the same or different.

In one possibly preferred embodiment, the metal salt(s) of the phenylphosphonic acid conform to a structure in which $R_1$, $R_2$, $R_3$, $R_4$, and $R_5$ of Formula (II) are each hydrogen, and $M_1$ is selected from the group consisting of cations of zinc, calcium, magnesium, lithium, sodium, potassium, barium, iron, copper, cobalt, aluminum, lanthanum, and zirconium. In another possibly preferred embodiment, the metal salt(s) of the phenylphosphonic acid conform to a structure in which $R_1$, $R_2$, $R_4$, and $R_5$ are each hydrogen, $R_3$ is a $C_1$-$C_4$ alkyl group (e.g., methyl, propyl, or tert-butyl), and $M_1$ is selected from the group consisting of cations of magnesium, calcium, zinc, copper, sodium, potassium, and tin (e.g., Sn(II) or Sn(IV)). In another possibly preferred embodiment, the metal salt(s) of the phenylphosphonic acid conform to a structure in which $R_1$, $R_2$, and $R_5$ are each hydrogen, $R_3$ and $R_4$ are each independently selected $C_1$-$C_4$ alkyl groups (e.g., methyl), and $M_1$ is selected from the group consisting of cations of zinc, magnesium, calcium, sodium, potassium, lithium, and tin. In another possibly preferred embodiment, the metal salt(s) of the phenylphosphonic acid conform to a structure in which $R_1$, $R_2$, $R_4$, and $R_5$ are each hydrogen, $R_3$ is a $C_1$-$C_4$ alkoxy group (e.g., methoxy), and $M_1$ is selected from the group consisting of cations of zinc, calcium, magnesium, copper (e.g., Cu(II)), cerium, titanium, and sodium. In another possibly preferred embodiment, the metal salt(s) of the phenylphosphonic acid conform to a structure in which $R_1$, $R_3$, and $R_5$ are each hydrogen, $R_2$ and $R_4$ are each independently selected $C_1$-$C_4$ alkoxy groups (e.g., methoxy), and $M_1$ is selected from the group consisting of cations of zinc, calcium, sodium, potassium, and lithium. In another possibly preferred embodiment, the metal salt(s) of the phenylphosphonic acid conform to a structure in which $R_1$, $R_2$, $R_4$, and $R_5$ are each hydrogen, $R_3$ is a halogen (e.g., fluorine or chlorine), and $M_1$ is selected from the group consisting of cations of zinc, calcium, sodium, potassium, and lithium. In another possibly preferred embodiment, the metal salt(s) of the phenylphosphonic acid conform to a structure in which $R_1$, $R_3$, $R_4$, and $R_5$ are each hydrogen, $R_2$ is a halogen (e.g., fluorine or chlorine), and $M_1$ is selected from the group consisting of cations of zinc, calcium, sodium, potassium, and lithium.

The nucleating agent present in the composition of the invention can also contain two or more different metal cations. The phenylphosphonic acids and metal cations useful in such phenylphosphonic acid salts can be any suitable acids and metal cations, including those discussed above. In such an embodiment, the metal salt of the phosphonic acid can conform to the structure of Formula (III) below

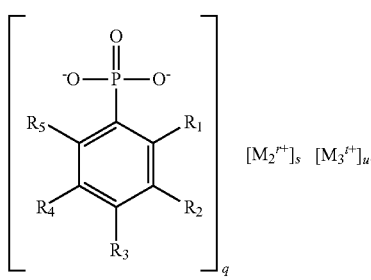

(III)

In the structure of Formula (III), q is a positive integer. $R_1$, $R_2$, $R_3$, $R_4$, and $R_5$ are substituents independently selected from the group consisting of hydrogen, $C_1$-$C_8$ alkyl groups, $C_1$-$C_8$ alkoxy groups, aryl groups (e.g., phenyl groups), and halogens. The variable s is a positive integer, $M_2$ represents a metal cation, and the variable r is valence of the metal cation $M_2$. The variable u is a positive integer, $M_3$ represents a metal cation, and the variable t is the valence of the metal cation $M_3$. The values of q, r, s, t, and u satisfy the following equation $2q=rs+tu$. In a possibly preferred embodiment, each $M_3$ and $M_4$ is a metal cation independently selected from the group consisting of alkali metal cations (e.g., lithium, sodium, or potassium), alkaline earth metal cations (e.g., magnesium, calcium, strontium, or barium), transition metal cations (e.g., zinc, copper, titanium, iron, cobalt, or zirconium), lanthanide cations (e.g., lanthanum or cerium), and poor metal cations (e.g., aluminum or tin).

The nucleating agent present in the composition of the invention can also be a metal salt of two or more different phenylphosphonic acids. The phenylphosphonic acids and metal cations useful in such phenylphosphonic acid salts can be any suitable acids and metal cations, including those discussed above. In such an embodiment, the metal salt of the phosphonic acid can conform to the structure of Formula (IV) below

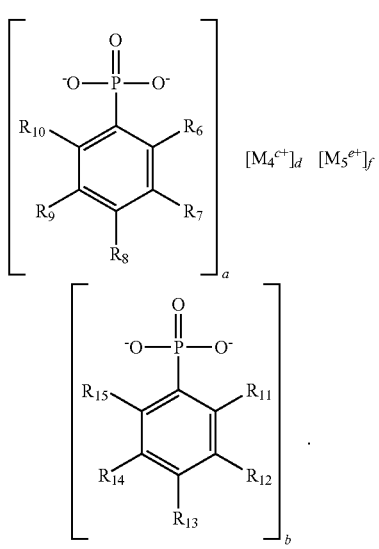

(IV)

In the structure of Formula (IV), a and b are positive integers. $R_6$, $R_7$, $R_8$, $R_9$, $R_{10}$, $R_{11}$, $R_{12}$, $R_{13}$, $R_{14}$, and $R_{15}$ are substituents independently selected from the group consisting of hydrogen, $C_1$-$C_8$ alkyl groups, $C_1$-$C_8$ alkoxy groups, aryl groups (e.g., phenyl groups), and halogens. The variable d is a positive integer, $M_4$ is a metal cation, and the variable c is the valence of the metal cation $M_4$. If only one type of metal cation is present in the salt, f is zero. If more than one different metal cation is present in the salt (i.e., the salt contains a metal cation $M_4$ and a different metal cation $M_5$), the variable f is a positive integer, $M_5$ is a metal cation, and the variable e is the valence of the metal cation $M_5$. The values of a, b, c, d, e, and f satisfy the following equation $2(a+b)=cd+ef$. Because the two phenylphosphonate moieties are different, at least one of the pairs of $R_6$ and $R_{11}$, $R_7$ and $R_{12}$, $R_8$ and $R_{13}$, $R_9$ and $R_{14}$, and $R_{10}$ and $R_{15}$ are different (i.e., the substituents in the pair are not the same). In a possibly preferred embodiment, each $M_2$ is a metal cation independently selected from the group consisting of alkali metal cations (e.g., lithium, sodium, or potassium), alkaline earth metal cations (e.g., magnesium, calcium, strontium, or barium), transition metal cations (e.g., zinc, copper, titanium, iron, cobalt, or zirconium), lanthanide cations (e.g., lanthanum or cerium), and poor metal cations (e.g., aluminum or tin).

The metal salt(s) of the phenylphosphonic acid can be synthesized using any suitable technique, many of which will be readily apparent to those of ordinary skill in the art. For example, if the phenylphosphonic acid(s) used in making the metal salt is commercially available, the metal salt(s) of the phenylphosphonic acid(s) can be prepared by reacting the phenylphosphonic acid with a metal salt (e.g., a metal salt comprising the desired metal cation and a Lowry-Brønsted base) in a suitable medium (e.g., an aqueous medium). If the phenylphosphonic acid(s) to be used in making the metal salt are not commercially available, the phenylphosphonic acid(s) can be synthesized, for example, using the Michaelis-Arbuzov reaction. In this reaction, the appropriate substituted aryl halide (e.g., substituted aryl bromide) is reacted with a trialkyl phosphite (e.g., triethylphosphite) to yield a crude dialkylarylphosphonate. This reaction can be performed in the presence of anhydrous nickel chloride. The crude diethylarylphosphonate can be purified by distillation, and the purified diethylarylphosphonate can be hydrolyzed (e.g., using boiling aqueous hydrochloric acid) to yield the substituted phenylphosphonic acid. Once the desired substituted phenylphosphonic acid is obtained, the metal salt(s) can be produced as described above (e.g., by reacting the substituted phenylphosphonic acid with a metal salt in an appropriate medium).

The metal salts of the phenylphosphonic acids suitable for use as nucleating agents in the composition of the invention can be either a hydrate or a dehydrate. As will be understood by those of ordinary skill in the art, the hydrate of a metal salt of a phenylphosphonic acid comprises water molecules (i.e., waters of crystallization or waters of hydration) incorporated into the structure (e.g., crystalline structure) of the salt. The water molecules can be incorporated into the structure of the salt upon crystallization of the salt from aqueous media or moist solvents (i.e., solvents containing some water), or the water molecules can be absorbed from water vapor present in the atmosphere. These water molecules typically can be removed from the metal salt of the phenylphosphonic acid by heating the metal salt to a temperature sufficient to drive off the water molecules, thereby yielding the dehydrate or anhydrous form of the metal salt of the phenylphosphonic acid. As noted above, the metal salts of the phenylphosphonic acids suitable for use as nucleating agents in the composition of the invention can be either a hydrate or a dehydrate. In certain embodiments, the metal salts of the phenylphosphonic acids are dehydrates (i.e., metal salts that do not have water molecules incorporated into the structure of the salt).

The nucleating agent typically is present in the composition in a particulate form. The particulate form comprises primary particles, and the primary particles can be loosely associated to form agglomerates. The primary particles have three dimensions, the two larger of which will hereinafter be referred to as the "length" and "width" of the primary particle. The length and width of the primary particles can be measured by visual inspection (e.g., visual inspection of particles imaged using, for example, a scanning electron microscope) or using a particle size analyzer. The length and width of individual primary particles can be used to calculate the aspect ratio for that primary particle. As utilized herein, the "aspect ratio" refers to the value that is the ratio of a primary particle's length to that primary particle's width. For a given collection of primary particles, the aspect ratios of the primary particles in the collection can be averaged (i.e., determine their arithmetic mean) in order to obtain the "mean aspect ratio" of the primary particles in the collection. The "mean aspect ratio" of a particular collection of primary particles can also be obtained by measuring a representative number of randomly-selected primary particles from the collection to determine their individual aspect ratios and then averaging each of those aspect ratios to determine their average (i.e., determine the arithmetic mean of the values).

The primary particles of the nucleating agent used in the composition of the invention can have any suitable mean aspect ratio. Preferably, the nucleating agent comprises primary particles having a mean aspect ratio of about 2 or more (e.g., about 3 or more or about 4 or more). More preferably, the nucleating agent comprises primary particles having a mean aspect ratio of about 5 or more (e.g., about 6 or more, about 7 or more, about 8 or more, or about 9 or more). Most preferably, the nucleating agent comprises primary particles having a mean aspect ratio of about 10 or more. In certain embodiments, the nucleating agent comprises primary particles have a mean aspect ratio of about 100 or less, about 50 or less, or about 40 or less.

The nucleating agent can be present in the composition in any suitable amount. For example, the nucleating agent can be present in the composition in an amount of about 100 ppm to about 10,000 ppm, based on the total weight of the composition. The nucleating agent preferably is present in the composition in an amount of about 250 ppm to about 10,000 ppm or more preferably in an amount of about 500 ppm to 5,000 ppm, based on the total weight of the composition.

The composition of the invention can comprise any suitable combination of two or more of the above-described nucleating agents. For example, the composition can comprise different metal salts of the same phenylphosphonic acid, or the composition can comprise metal salts of different phenylphosphonic acids. When used in combination, each individual nucleating agent can be present in the composition in any suitable amount, including those amounts mentioned above. Each nucleating agent can also be present in the composition in an amount such that the total amount of all the nucleating agents present in the composition falls within the amounts specified above.

The compositions described herein can contain other additives in addition to the thermoplastic and the nucleating agent. For example, the compositions can also comprise one or more additives selected from the group consisting of nucleating agents (i.e., nucleating agents other than a metal salt of a phenylphosphonic acid), acid scavengers, antioxidants, light stabilizers, plasticizers, colorants, pigments, and other suitable thermoplastic additives.

In certain possibly preferred embodiments, the composition comprises an acid scavenger in addition to the thermoplastic and the nucleating agent. The acid scavengers suitable for use in the composition of the invention can be any suitable acid scavenger. Preferably, the acid scavenger is selected from the group consisting of metal salts of stearic acid, such as calcium stearate, zinc stearate, magnesium stearate, and mixtures thereof.

When present in the composition, the acid scavenger can be present in the composition of the invention in any suitable amount. Preferably, the acid scavenger is present in the composition in an amount of about 250 ppm to about 2500 ppm, based on the total weight of the composition. The acid scavenger is more preferably present in the composition in an amount of about 400 ppm to about 1500 ppm and most preferably about 500 ppm to about 1200 ppm, based on the total weight of the composition.

The composition of the invention can be made or compounded using any suitable technique. For example, the composition of the invention can be made by adding the nucleating agent to the thermoplastic and mixing the resulting composition by any suitable means.

The composition of the invention is useful in producing thermoplastic articles. The composition of the invention can be formed into the desired thermoplastic article by any suitable technique, such as injection molding, blow molding (e.g., injection blow molding or injection stretch blow molding), extrusion, extrusion blow molding, thermoforming, rotomolding, film blowing (blown film), film casting (cast film), and the like. While not wishing to be bound to any particular theory, it is believed that the processing conditions used in such techniques orient the nucleating agent within the thermoplastic in such a way as to increase the beneficial properties imparted to the thermoplastic. In such processes, a thermoplastic material is melted and injected or extruded through a gate or die having relatively small dimensions. As the melted thermoplastic flows through the gate or die, it is believed that the nucleating agent particles contained in the melted thermoplastic are forced to assume a relatively ordered orientation. When the nucleating agent particles have a mean aspect ratio of about 2 or more, it is believed that a large proportion of the particles assume an orientation in which the length of the particles (i.e., the longest dimension of the particles) is roughly parallel to the direction of flow through the gate or die. After flowing through the gate or die, the thermoplastic is cooled relatively quickly, which inhibits the nucleating agent particles from assuming a more randomized orientation. While not wishing to be bound to any particular theory, it is believed that, as the thermoplastic is cooled, the polymer chains of the thermoplastic begin to crystallize in a relatively ordered arrangement caused by their interaction with the relatively ordered nucleating agent particles. The resulting thermoplastic exhibits a relatively high degree of polymer orientation. It is believed that the relatively high degree of polymer orientation that results is at least partially responsible for the beneficial properties observed for the compositions of the invention.

Thus, it is believed that certain compositions of the invention (e.g., a composition comprising a nucleating agent comprising a metal salt of a phenylphosphonic acid and comprising primary particles having a mean aspect ratio of about 2 or more) are particularly useful in processes in which the melted composition is first extruded or injection through an orifice so that the melted composition is subjected to laminar flow and subsequently processed and cooled in such a way as not to significantly disturb the orientation of the nucleating agent particles caused by the laminar flow conditions. It is believed that all of the processes or techniques specifically mentioned in the preceding paragraph provide such conditions. Preferably, the composition of the invention is formed into a thermoplastic article by injection molding, thermoforming, or extrusion blow molding, more preferably by thermoforming.

In one embodiment, the invention provides a method for producing a thermoplastic article using a thermoforming method. In this method, a composition such as those described above is used to produce the thermoplastic article. For example, the thermoplastic composition can comprise a thermoplastic and a nucleating agent. The thermoplastic preferably is a polyolefin selected from the group consisting of polypropylene homopolymers, polypropylene copolymers, polyethylene, polyethylene copolymers, polybutylene, poly (4-methyl-1-pentene) and mixtures thereof, and the nucleating agent preferably comprises a metal salt of a phenylphosphonic acid. The thermoplastic composition is heated to a temperature sufficient to melt the composition so that it can flow when subjected to sufficient pressures. Once the composition is melted, the thermoplastic composition is then extruded into a sheet using, for example, conventional sheet forming equipment. The resulting sheet is then cooled to a temperature sufficient to at least partially solidify the thermoplastic composition, which prevents the thermoplastic composition from flowing or the sheet from deforming. The sheet can be allowed to cool to ambient temperature, or the sheet can be allowed to cool to a temperature at which the thermoplastic composition has solidified but remains sufficiently soft that the sheet can be molded. If the sheet is allowed to cool to such a degree that the sheet cannot be molded, the sheet is then reheated to a temperature sufficient to soften the thermoplastic composition. The sheet is then placed onto a molding having a surface that defines the shape of the thermoplastic article or at least a portion of the thermoplastic article. The sheet is then subjected to one or more forces sufficient to cause the sheet to conform to the shape of the mold. For example, the molding step can be assisted by applying a vacuum to the volume between the sheet and the mold surface. After molding, the sheet is then allowed to cool to a temperature sufficient to solidify the thermoplastic composition so that it can retain the desired shape. The resulting molded sheet can then be trimmed as necessary to yield the thermoplastic article.

In another embodiment, the invention provides a method for producing a thermoplastic article using an injection molding method. In this method, a composition such as those described above is used to produce the thermoplastic article. For example, the thermoplastic composition can comprise a thermoplastic and a nucleating agent. The thermoplastic preferably is a polyolefin selected from the group consisting of polypropylene homopolymers, polypropylene copolymers, polyethylene, polyethylene copolymers, polybutylene, poly (4-methyl-1-pentene) and mixtures thereof, and the nucleating agent preferably comprises a metal salt of a phenylphosphonic acid. The thermoplastic composition is heated to a temperature sufficient to melt the composition so that it can flow when subjected to sufficient pressures. In an injection molding apparatus, the thermoplastic composition is often heated by a reciprocating, screw-type extruder that melts the thermoplastic composition through the friction generated by the rotating screw. The melted thermoplastic composition is then injected into the mold cavity defining at least a portion of the thermoplastic article. In a typical injection molding apparatus, the melted thermoplastic composition is injected into the mold cavity by advancing the reciprocating screw, which provides the force necessary to flow the thermoplastic composition into the mold. The reciprocating screw also typically is used to maintain pressure on the thermoplastic composition to ensure that the mold remains filled while the thermoplastic composition cools and solidifies. The thermoplastic composition is then allowed to cool to a temperature sufficient to at least partially solidify the composition so that the resulting article retains the desired shape. The resulting thermoplastic article is then removed or ejected from the mold cavity.

In another embodiment, the invention provides a method for producing a thermoplastic article using an extrusion blow molding method. In this method, a composition such as those described above is used to produce the thermoplastic article. For example, the thermoplastic composition can comprise a thermoplastic and a nucleating agent. The thermoplastic preferably is a polyolefin selected from the group consisting of polypropylene homopolymers, polypropylene copolymers, polyethylene, polyethylene copolymers, polybutylene, poly (4-methyl-1-pentene) and mixtures thereof, and the nucleating agent preferably comprises a metal salt of a phenylphosphonic acid. The thermoplastic composition is heated to a temperature sufficient to melt the composition so that it can flow when subjected to sufficient pressures. The melted thermoplastic composition is then extruded through an appropriate die to produce a hollow tube or parison. The parison is then captured or placed into the mold cavity (i.e., the space defined by the interior of the mold) of a blow molding apparatus. The mold cavity defines at least a portion of the surface and/or shape of the desired article. After the parison is enclosed in the mold cavity, pressurized gas (e.g., pressurized air) is blown into the parison so that it inflates relative to one or more of its original dimensions and assumes the shape defined by the mold cavity (i.e., the shape defined by the interior surfaces of the mold). The thermoplastic composition is then allowed to cool to a temperature sufficient to at least partially solidify the composition so that the resulting article retains the desired shape. The resulting thermoplastic article is then removed or ejected from the mold cavity.

The composition of the invention can be used to produce any suitable article or product. Suitable products include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like.

The following examples further illustrate the subject matter described above but, of course, should not be construed as in any way limiting the scope thereof.

EXAMPLE 1

This example demonstrates the synthesis of a metal salt of a phenylphosphonic acid suitable for use in the composition of the invention. Approximately 800 mL of deionized water and approximately 47.43 g (300 mmol) of phenylphosphonic acid were added to a beaker fitted with a magnetic stirrer, and the contents of the beaker were stirred until the phenylphosphonic acid completely dissolved. The pH of the resulting solution was adjusted to approximately 10.59 by titration with a 30% aqueous solution of sodium hydroxide. In a separate beaker, approximately 70.84 g (300 mmol) of calcium nitrate tetrahydrate was dissolved in approximately 800 mL of deionized water. The calcium nitrate tetrahydrate solution was then poured into the phenylphosphonic acid solution. A white precipitate quickly formed and the contents of the beaker were stirred for approximately 5 minutes. The white precipitate was collected by suction filtration, washed with deionized water, and dried in an oven at approximately 105° C.

The white precipitate was then analyzed by infrared absorption spectroscopy. The observed absorption spectrum was consistent with the expected product, which was a hydrate of calcium phenylphosphonate. In particular, it is believed that the product was calcium phenylphosphonate monohydrate.

The collected calcium phenylphosphonate was ground into a fine powder using a Retsch ZM100 grinding mill fitted with 0.06 mm classifying screens.

EXAMPLE 2

This example demonstrates the synthesis of a metal salt of a phenylphosphonic acid suitable for use in the composition of the invention. Approximately 20 g of the ground calcium phenylphosphonate hydrate product from Example 1 was placed in a vacuum oven and maintained at a temperature of approximately 200° C. for approximately 17 hours.

The material was then removed from the vacuum oven and analyzed by infrared absorption spectroscopy. The observed spectra did not show any appreciable absorption due to waters of hydration (such as those observed for the product synthesized in Example 1). Accordingly, the product is believed to be anhydrous calcium phenylphosphonate.

EXAMPLE 3

This example demonstrates an alternative synthesis of a metal salt of a phenylphosphonic acid. Approximately 1200 g of 0.3 mm zirconium beads, approximately 8 g (108 mmol) of calcium hydroxide, approximately 17.07 g (108 mmol) of phenylphosphonic acid, and approximately 300 mL of water were added to the cylinder of a ball-mill. Approximately 1800 g of additional zirconium beads were then added to the cylinder in order to bring the level of liquid in the cylinder to the top of the stirrer paddle. The ball-mill was then agitated at a speed of approximately 1700 rpm for approximately 20 hours.

The resulting milky suspension was poured through a sieve to remove the zirconium beads, and the beads were repeatedly washed until the wash water was no longer white. The white precipitate was then collected from the suspension by suction filtration, washed twice with acetone, and dried in an oven overnight at a temperature of approximately 105° C. The final weight of the resulting product was approximately 21.33 g, which corresponded to a yield of approximately 85%.

The collected product was analyzed by infrared absorption spectroscopy. The observed absorption spectrum was consistent with the expected product, which was a hydrate of calcium phenylphosphonate. In particular, it is believed that the product was calcium phenylphosphonate monohydrate.

EXAMPLE 4

This example demonstrates the synthesis of a metal salt of a phenylphosphonic acid suitable for use in the composition of the invention. Approximately 100 mL of deionized water and approximately 15.81 g (100 mmol) of phenylphosphonic acid were added to a beaker fitted with a magnetic stirrer, and the contents of the beaker were stirred until the phenylphosphonic acid completely dissolved. In a separate beaker, approximately 7.8 g (105 mmol) of calcium hydroxide was added to approximately 100 mL of deionized water and stirred to form a calcium hydroxide slurry. The calcium hydroxide slurry was then poured into the phenylphosphonic acid solution. A white precipitate quickly formed and the contents of the beaker were stirred for approximately 5 minutes. The white precipitate was collected by suction filtration and washed with deionized water. The white precipitate was then washed with acetone and dried in an oven at approximately 200° C.

The white precipitate was then analyzed by infrared absorption spectroscopy. The observed absorption spectrum was consistent with the expected product, which was anhydrous calcium phenylphosphonate.

The collected calcium phenylphosphonate was ground into a fine powder using a Retsch ZM100 grinding mill fitted with 0.06 mm classifying screens.

EXAMPLE 5

This example demonstrates the synthesis of a metal salt of a phenylphosphonic acid suitable for use in the composition of the invention. Approximately 800 mL of deionized water, approximately 66.57 g (421 mmol) of phenylphosphonic acid, and approximately 4 mL of an ethylene oxide/propylene oxide block copolymer nonionic surfactant (Pluronic® L62LF available from BASF Corporation) were added to a beaker fitted with a magnetic stirrer, and the contents of the beaker were stirred until the phenylphosphonic acid completely dissolved. In a separate beaker, approximately 92.48 g (421 mmol) of zinc acetate dihydrate and approximately 4 mL of an ethylene oxide/propylene oxide block copolymer nonionic surfactant (Pluronic® L62LF available from BASF Corporation) were added to approximately 800 mL of deionized water, and the contents of the beaker were stirred until the zinc acetate dehydrate completely dissolved. The zinc acetate solution was then poured into the phenylphosphonic acid solution while stirring with a high shear, mechanical stirrer. A white precipitate quickly formed and the contents of the beaker were stirred for approximately 5 minutes. The white precipitate was collected by suction filtration and washed with deionized water. The collected precipitate was then washed with acetone and dried in an oven at approximately 105° C.

The white precipitate was then analyzed by infrared absorption spectroscopy. The observed absorption spectrum was consistent with the expected product, which was zinc phenylphosphonate.

The collected zinc phenylphosphonate was ground into a fine powder using a Retsch ZM100 grinding mill fitted with 0.06 mm classifying screens.

EXAMPLE 6

This example demonstrates the synthesis of a metal salt of a phenylphosphonic acid suitable for use in the composition of the invention. Approximately 100 g (585 mmol) of 4-bromotoluene and approximately 5.68 g (43.8 mmol) of anhydrous nickel chloride were added to a three-neck, round bottom flask fitted with a distillation head and a bar stirrer. The contents of the flask were heated to approximately 150° C. and approximately 116.7 g (702 mmol) of triethylphosphite was added dropwise to the flask. After cooling, the resulting reaction mixture was added to an equivalent amount of methylene chloride and then washed with approximately 5 mL of a 5% aqueous solution of hydrochloric acid. The contents were then placed in a separatory funnel and the aqueous layer was removed. The methylene chloride layer was then washed with water, separated from the aqueous layer, and dried over magnesium sulfate. The magnesium sulfate was then removed by suction filtration.

The resulting mixture was then distilled under reduced pressure to remove the methylene chloride and any low-boiling impurities. The resulting crude diethyl (4-methylphenyl)phosphonate was then distilled in a three-neck flask under reduced pressure at a temperature of approximately 90 to 120° C. The distilled diethyl (4-methylphenyl)phosphonate and approximately 370 mL of aqueous hydrochloric acid were then added to a three-neck flask fitted with a condenser. The resulting mixture was then heated at reflux for approximately 16 hours, allowed to cool slowly to room temperature, and then placed in an ice bath to precipitate the desired product. The precipitate was then collected by suction filtration and then dried in a vacuum oven at a temperature of approximately 60° C. The final weight of the product was approximately 54.48 g. The precipitate was analyzed by infrared absorption spectroscopy. The observed spectra was consistent with the expected product, which was (4-methylphenyl) phosphonic acid.

The (4-methylphenyl)phosphonic acid was then reacted with calcium nitrate tetrahydrate as described above in Example 1 to produce the calcium salt of (4-methylphenyl) phosphonic acid, calcium (4-methylphenyl)phosphonate.

EXAMPLE 7

This example demonstrates the characterization of the mean aspect ratio of the primary particles of salts produced by different methods. The calcium phenylphosphonate salts from each of Examples 1-3 were separately dusted on double-sided copper tapes attached to scanning electron microscope (SEM) stubs. Excess salt was removed from the copper tapes using compressed air, and the salt remaining on the copper tapes was coated with a layer of gold approximately 100-150 Å thick.

Micrographs of the particles were then taken from multiple areas on the SEM stubs and copper tapes using a scanning electron microscope (Quanta FEG scanning electron microscope from FEI Company). Within each micrograph, the length and width of eight to ten randomly chosen primary particles were measured from the micrograph image. For each of the salts, a total of twenty to thirty primary particles were measured. The aspect ratio of each primary particle was then calculated by dividing the measured length of the primary particle by the measured width of the primary particle. The mean aspect ratio for each sample was then calculated by determining the arithmetic mean of the calculated aspect ratios. The mean aspect ratio for each of the samples is set forth in Table 1 below.

TABLE 1

Mean aspect ratio of primary particles for salts from Examples 1-3.

| Sample | Mean Aspect Ratio of Primary Particles |
|---|---|
| Example 1 | 6.2 |
| Example 2 | 12 |
| Example 3 | 1.3 |

EXAMPLE 8

This example demonstrates the production of compositions according to the invention and the nucleating capabilities of certain metal salts of phenylphosphonic acids. The metal salts from Examples 1-3 were compounded into batches of polypropylene homopolymer compositions (Examples 8A, 8B, and 8C, respectively) in accordance with the general formulation set forth in Table 2 below.

TABLE 2

General formulation for polypropylene homopolymer compositions.

| Component | Amount |
|---|---|
| Polypropylene homopolymer | 995.5 g |
| Primary antioxidant (Irganox ® 1010) | 0.5 g |
| Secondary antioxidant (Irgafos ® 168) | 1.0 g |
| Acid scavenger | 1.0 g |
| Phenylphosphonate salt | 2.0 g |

Comparative examples were also prepared by compounding polypropylene homopolymer compositions without a nucleating agent (Comparative Example 1) and another commercially available nucleating agent (Comparative Example 2). In particular, Comparative Example 2 was produced by compounding in accordance with the general formulation set forth in Table 2, but using only 1.0 g of sodium 2,2'-methylenebis (4,6-di-tent-butylphenyl)phosphate (NA-11 from Adeka Corporation) and 800 mg of a hydrotalcite-like acid scavenger (DHT-4A from Kyowa Chemical Industry Co., Ltd.).

Each of the polypropylene homopolymer compositions was compounded by blending the components in a Henschel high intensity mixer for approximately two minutes at a blade speed of approximately 2100 rpm. The polypropylene homopolymer compositions were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polypropylene homopolymer composition was cooled in a water bath and subsequently pelletized.

The pelletized polypropylene homopolymer compositions were then used to form plaques by injection molding the compositions on an Arburg 40 ton injection molder having a 25.4 mm diameter screw. The barrel temperature of the injection molder was approximately 200 to 220° C., and the mold temperature was approximately 25° C. The resulting plaques measured approximately 60 mm long, approximately 60 mm wide, and approximately 2 mm thick. The plaques were then subjected to the tests described below.

The peak polymer recrystallization temperature ($T_c$) for each of the polypropylene homopolymer compositions was measured using a differential scanning calorimeter (Mettler-Toledo DSC822 differential scanning calorimeter). In particular, an approximately 5 milligram sample was taken from the target plaque and heated at a rate of 20° C./minute from a temperature of 50° C. to 220° C., held at 220° C. for two minutes, and cooled at a rate of approximately 20° C./minute to a temperature of 50° C. The temperature at which peak polymer crystal reformation occurred (which corresponds to the peak polymer recrystallization temperature) was recorded for each sample and is reported in Table 3 below.

The flexural modulus for the plaques (reported as the 1% secant modulus) was measured using an MTS Q-Test-5 having a span of 32 mm, a fixed deflection rate of 8.53 mm/minute, and a nominal sample width of 50.8 mm. The samples for testing were prepared by cutting square sections (measuring approximately 50 mm by 50 mm) from the plaques in order to obtain an isotropically sized sample. The samples were tested by flexing across the machine/flow direction (the "transverse direction" or TD in Table 3 below) and by flexing across the transverse direction and parallel to the machine/flow direction (the "machine direction" of MD in Table 3 below) in order to determine the bi-directional stiffness of the samples. The results for each of the samples are set forth in Table 3 below.

The Gardner impact resistance of each of the samples was measured at room temperature in accordance with ASTM Standard D5420-98A on a BYK-Gardner Impact tester using a 1 lb or 2 lb weight with a GC geometry and no clamping. The percent haze for each sample was measured in accordance with ASTM Standard D1003-92 using a BYK-Gardner Haze-Gard Plus. The Gardner impact resistance (reported as the mean failure energy) and haze measurement for each of the samples are set forth in Table 3 below.

TABLE 3

Physical properties for Samples 8A-8C and Comparative Examples 1-2.

| Sample | $T_c$ (° C.) | Haze (%) | 1% Secant Modulus TD (MPa) | 1% Secant Modulus MD (MPa) | Gardner Impact (J) |
|---|---|---|---|---|---|
| 8A | 126 | 63.5 | 1860 | 1849 | 2.8 |
| 8B | 127 | 61.3 | 1864 | 1867 | 3.0 |
| 8C | 123 | 69.3 | 1809 | 1826 | 1 |
| Comp. Ex. 1 | 115 | 92 | 1420 | 1458 | 1.1 |
| Comp. Ex. 2 | 127 | 62.9 | 1692 | 1718 | 0.4 |

The data set forth in Table 3 show that the polypropylene homopolymer compositions containing the phenylphosphonate salt comprising primary particles having a mean aspect ratio of greater than 2 exhibit relatively good performance across all of the properties tested. For example, Samples 8A and 8B (which were produced using the phenylphosphonate salts from Examples 1 and 2, respectively) exhibited higher flexural moduli in both the transverse direction and machine direction. Samples 8A and 8B also exhibited far greater Gardner Impact mean failure energies than the comparative examples and the homopolymer composition containing the phenylphosphonate salt comprising primary particles having a mean aspect ratio of less than 2. Sample 8B, which was produced using anhydrous calcium phenylphosphonate, exhibited higher peak polymer recrystallization temperature, lower haze, higher flexural moduli, and higher Gardner impact mean failure energy that Sample 8A, which was produced using a hydrate of calcium phenylphosphonate.

EXAMPLE 9

This example demonstrates the synergistic effects observed in compositions comprising phenylphosphonate salts and an acid scavenger that is a metal salt of stearic acid. Samples of polypropylene homopolymer compositions were compounded in accordance with the general formulation and procedures set forth in Example 8. The particular phenylphosphonate salt and acid scavenger used are specified in Tables 4 and 5 below. Comparative samples were also prepared using different nucleating agents (e.g., sodium 2,2'-methylenebis(4,6-di-tert-butylphenyl)phosphate) and acid scavengers. The components used are also specified in Tables 4 and 5 below. The comparative examples produced using sodium 2,2'-methylenebis(4,6-di-tert-butylphenyl)phosphate (NA-11 from Adeka Corporation) employed 1.0 g of the nucleating agent (0.1% loading). The amount of hydrotalcite-like acid scavenger (DHT-4A from Kyowa Chemical Industry Co., Ltd.) used in Comparative Example 8 was approximately 800 mg (0.08% loading). ZHT-4A, which was used in Comparative Example 12, is a hydrotalcite-type acid scavenger available from Kyowa Chemical Industry Co., Ltd. Comparative Example 13 used a calcium stearoyl-2-lactylate acid scavenger (Pationic 930 from Patco Additives), and Comparative Example 14 used a calcium lactate acid scavenger (Pationic 1230 from Patco Additives).

The polypropylene homopolymer compositions were formed into plaques using the general procedure set forth in Example 8. One set of plaques measured approximately 60 mm long, approximately 60 mm wide, and approximately 2 mm thick. A second set of plaques measured approximately 76 mm long, approximately 51 mm wide, and approximately 1.3 mm thick.

The plaques were then tested to determine the peak polymer recrystallization temperature ($T_c$), flexural modulus, Gardner impact resistance, and percent haze in accordance with the test procedures set forth in Example 8. The results for each of the samples are set forth in Tables 4 and 5 below.

TABLE 4

Physical properties of 2 mm plaques.

| Sample | Nucleating Agent | Acid Scavenger | 1% Secant Modulus TD (MPa) | 1% Secant Modulus MD (MPa) | Gardner Impact (J) |
|---|---|---|---|---|---|
| 9A | Ex. 1 | CaSt | 1792 | 1803 | 3 |
| 9B | Ex. 1 | ZnSt | 1793 | 1781 | 2.9 |
| 9C | Ex. 1 | MgSt | 1809 | 1760 | 2.7 |
| 9D | Ex. 6 | CaSt | 1737 | 1748 | 2.6 |
| 9E | Ex. 6 | ZnSt | 1725 | 1719 | 2.7 |
| 9F | Ex. 6 | MgSt | 1760 | 1736 | 2.8 |
| Comp. Ex. 3 | None | ZnSt | 1420 | 1458 | 1.1 |
| Comp. Ex. 4 | Ex. 1 | None | 1651 | 1672 | 2.4 |
| Comp. Ex. 5 | Ex. 1 | DHT-4A | 1681 | 1678 | 2.3 |
| Comp. Ex. 6 | Ex. 6 | None | 1691 | 1714 | 2.7 |
| Comp. Ex. 7 | Ex. 6 | DHT-4A | 1679 | 1677 | 2.5 |
| Comp. Ex. 8 | NA-11 | DHT-4A | 1692 | 1718 | 0.4 |

The data set forth in Table 4 show that the compositions comprising the combination of a phenylphosphonate salt and a metal salt of stearic acid exhibit higher flexural moduli and relatively high Gardner impact mean failure energies when compared to compositions comprising different acid scavengers.

TABLE 5

Physical properties of 1.3 mm plaques.

| Sample | Nucleating Agent | Acid Scavenger | $T_c$ (° C.) | Haze (%) |
|---|---|---|---|---|
| 9G | Ex. 1 | CaSt | 128 | 28.8 |
| 9H | Ex. 1 | ZnSt | 128 | 23.9 |
| 9I | Ex. 1 | NaSt | 126 | 29.7 |
| 9J | Ex. 1 | LiSt | 124 | 30.6 |
| 9K | Ex. 1 | MgSt | 126 | 24.2 |
| 9L | Ex. 6 | CaSt | 125 | 28.4 |
| 9M | Ex. 6 | ZnSt | 125 | 26.7 |
| 9N | Ex. 6 | NaSt | 123 | 30.5 |
| 9O | Ex. 5 | CaSt | 122 | 33.3 |
| 9P | Ex. 5 | ZnSt | 126 | 32.5 |
| 9Q | Ex. 5 | NaSt | 121 | 39.2 |
| Comp. Ex. 9 | Ex. 1 | None | 127 | 46 |
| Comp. Ex. 10 | Ex. 1 | DHT-4A | 128 | 41.4 |
| Comp. Ex. 11 | Ex. 1 | ZnO | 126 | 54.2 |
| Comp. Ex. 12 | Ex. 1 | ZHT-4A | 127 | 43.3 |
| Comp. Ex. 13 | Ex. 1 | Pationic 930 | 125 | 32.3 |
| Comp. Ex. 14 | Ex. 1 | Pationic 1230 | 126 | 44.3 |
| Comp. Ex. 15 | Ex. 6 | DHT-4A | 126 | 39.2 |
| Comp. Ex. 16 | Ex. 5 | DHT-4A | 126 | 39.5 |

The data set forth in Table 5 demonstrate that the compositions comprising the combination of a phenylphosphonate salt and a metal salt of stearic acid exhibit relatively high polymer peak recrystallization temperatures and lower percent haze when compared to compositions comprising different acid scavengers. The combination of high polymer peak recrystallization temperature and low haze appears to be particularly pronounced for those compositions containing a calcium salt of a phenylphosphonic acid and those compositions containing either a zinc stearate or a magnesium stearate acid scavenger.

EXAMPLE 10

This example demonstrates a method for producing a thermoplastic article in accordance with the invention. Two ninety kilogram batches of polypropylene homopolymer compositions (Sample 10 and Comparative Example 17) were compounded in accordance with the formulations set forth in Tables 6 and 7 below.

TABLE 6

Formulation for Sample 10.

| Component | Amount |
|---|---|
| Polypropylene homopolymer | 89595 g |
| Primary antioxidant (Irganox ® 1010) | 45.0 g |
| Secondary antioxidant (Irgafos ® 168) | 90.0 g |
| Zinc stearate acid scavenger | 90.0 g |
| Calcium phenylphosphonate (from Ex. 1) | 180.0 g |

TABLE 7

Formulation for Comparative Example 17.

| Component | Amount |
|---|---|
| Polypropylene homopolymer | 89730 g |
| Primary antioxidant (Irganox ® 1010) | 45.0 g |
| Secondary antioxidant (Irgafos ® 168) | 90.0 g |
| Acid scavenger (DHT-4A) | 45.0 g |
| Nucleating agent (NA-11) | 90.0 g |

Each of the polypropylene homopolymer compositions was compounded by blending the components in a Henschel high intensity mixer for approximately two minutes at a blade speed of approximately 2100 rpm. The samples were then melt compounded on a Leistritz Micro 27 GL/40D co-rotating, fully intermeshing, parallel, twin-screw extruder with a 27 mm screw diameter and a length/diameter ratio of 40:1. The barrel temperature of the extruder was ramped from approximately 195° C. to approximately 215° C., and the screw speed was set at approximately 500 rpm. The extrudate (in the form of a strand) for each polypropylene homopolymer composition was cooled in a water bath and subsequently pelletized.

Each of the pelletized polypropylene homopolymer compositions was used to produce extruded sheet on a Reifenhauser Mirex-W single-screw sheet extruder having an 80 mm screw diameter and a length/diameter ratio of 33:1. The barrel temperature of the extruder was approximately 230° C., and the coat-hanger manifold sheet die temperature was approximately 250° C. The molten polymer sheet was extruded onto a three-roll upstack consisting of 406 mm diameter polished rolls with roll temperatures of approximately 70° C., 80° C., and 70° C., respectively. The final polypropylene sheet had a thickness of 1.2 mm and was approximately 330 mm wide after trimming. Sheet samples were collected and tested as described below.

The flexural modulus of the sheet samples (reported as the 1% secant modulus) was measured in accordance with ASTM Standard D790-00 using an MTS Q-Test/5 instrument having a span of 20.32 mm and a fixed deflection rate of 5.42 mm/minute. The samples for testing were prepared by cutting rectangular section measuring approximately 76 mm by approximately 51 mm from the sheet samples. The samples were tested by flexing across the machine/flow direction (the "transverse direction" or TD in Table 8 below) and by flexing across the transverse direction and parallel to the machine/flow direction (the "machine direction" of MD in Table 8 below) in order to determine the bi-directional stiffness of the samples. The results for each of the samples are set forth in Table 8 below.

Samples from the sheets were also tested to determine their shrinkage when exposed to elevated temperatures. A rectangular section measuring approximately 255 mm by approximately 50 mm was cut lengthwise from each sheet. The original dimensions of each section were then measured using a digital micrometer. The rectangular sections were then placed in a forced-air convection oven at a temperature of approximately 164° C. for approximately 12 minutes. The final dimensions of each rectangular sheet were then measured using a digital micrometer. The percent shrinkage for both the machine/flow direction and the transverse direction (which are reported in Table 8 below) were then calculated using the following equation:

$$\text{Percent Shrinkage} = \frac{\text{Original Dimension} - \text{Final Dimension}}{\text{Original Dimension}} \times 100.$$

The percent haze for the sheets was measured in accordance with ASTM Standard D1003-92 using a BYK-Gardner Haze-Gard Plus. The gloss of both the top and bottom of the sheets was measured in accordance with ASTM Standard D523 using a BYK-Gardner micro-TRI-gloss 4520 at an angle of 20°. The measured percent haze and gloss values for the sheets are set forth in Table 8 below.

TABLE 8

Physical properties extruded polypropylene sheet made from Sample 10 and Comparative Example 17.

| | Sample 10 | Comp. Ex. 17 |
|---|---|---|
| Haze (%) | 31 | 34.9 |
| Gloss Sheet Top (%) | 103.0 | 97.7 |
| Gloss Sheet Bottom (%) | 107.1 | 102.5 |
| 1% Secant Modulus MD (MPa) | 2017 | 1824 |
| 1% Secant Modulus TD (MPa) | 1958 | 1854 |
| Shrinkage TD (%) | 0.24 | 1.18 |
| Shrinkage MD (%) | 0.54 | 0.8 |

As can be seen from the data set forth in Table 8, the sheet formed from the composition of the invention (i.e., a composition comprising a metal salt of a phenylphosphonic acid) exhibited lower sheet haze, higher sheet gloss, higher stiffness, and lower shrinkage than the sheet formed from a composition comprising a conventional nucleating agent.

Portions of the extruded sheets produced using Sample 10 and Comparative Example 17 were also directly fed into an in-line Illig RDM54K plug-assisted solid-phase thermoforming machine and formed into cups measuring approximately 93 mm wide and approximately 53 mm deep. The thermoforming machine was equipped with longitudinal row control for both upper and lower infrared ceramic heaters. The extruded sheet was heated so that the surface of the polypropylene sheet immediately before forming was approximately 155° C. The resulting polypropylene cups were then collected and tested as described below.

The top load strength (reported as peak load) of the cups was tested in accordance with ASTM Standard D2659 using an MTS Q-Test/5 instrument with a fixed crosshead speed of 50.0 mm/minute. The measurements for the cups are set forth in Table 9 below.

TABLE 9

Top load strengths for thermoformed cups made from Sample 10 and Comparative Example 17.

| Sample | Top Load Strength Peak Load (N) |
|---|---|
| 10 | 277.6 |
| Comp. Ex. 17 | 236.8 |

The data set forth in Table 9 show that the cups formed from the sheet made using a composition according to the invention (i.e., a composition comprising a metal salt of a phenylphosphonic acid) exhibited higher top load strength than cups made from a composition comprising a conventional nucleating agent. In particular, cups made from a composition according to the invention (Sample 10) exhibited a top load strength that was over 17% higher than the top load strength of cups made from a conventional nucleating agent (Comparative Example 17).

EXAMPLE 11

This example demonstrates the synthesis of a metal salt of a phenylphosphonic acid suitable for use in the composition of the invention. Approximately 200 mL of deionized water and approximately 10.04 g (64 mmol) of phenylphosphonic acid were added to a 500 mL three-neck, round bottom flask fitted with a stir paddle, thermocouple, and a heating mantle. The resulting mixture was stirred until the phenylphosphonic acid had completely dissolved, and the pH of the resulting solution was then adjusted to approximately 10.3 by titration with a 30% aqueous solution of sodium hydroxide. In a separate beaker, approximately 15.11 g (64 mmol) of calcium nitrate tetrahydrate was dissolved in approximately 200 mL of deionized water. The calcium nitrate tetrahydrate solution was then poured into the phenylphosphonic acid solution while stirring with a mechanical stirrer, and a white precipitate quickly formed. The resulting mixture was then heated to a temperature of approximately 80° C., and the mixture was then stirred for approximately 3 hours at that temperature. The resulting white precipitate was collected by suction filtration, washed with deionized water, and dried in an oven at a temperature of approximately 105° C.

The white precipitate was then analyzed by infrared absorption spectroscopy. The observed absorption spectrum was consistent with the expected product, which was a hydrate of calcium phenylphosphonate. In particular, it is believed that the product was calcium phenylphosphonate monohydrate.

The collected calcium phenylphosphonate was ground into a fine powder using a Retsch ZM100 grinding mill fitted with 0.06 mm classifying screens.

The mean aspect ratio of the calcium phenylphosphonate produced according to the above-described method was characterized in accordance with the procedure described in Example 7. The results of these measurements are set forth in Table 10 below. For purposes of comparison, the mean aspect ratios for the salts produced in Examples 1-3 are also set forth in Table 10.

TABLE 10

Mean aspect ratio of primary particles for salts from Examples 1-3 and 11.

| Sample | Mean Aspect Ratio of Primary Particles |
|---|---|
| Example 1 | 6.2 |
| Example 2 | 12 |
| Example 3 | 1.3 |
| Example 11 | 36 |

EXAMPLE 12

This example demonstrates the reduced isothermal crystallization half times exhibited by the compositions of the invention. Nine one kilogram batches of polypropylene homopolymer compositions (Samples 12A-12H and Comparative Example 18) were compounded in accordance with the formulation set forth in Tables 11 and 12 below. The particular nucleating agent used in Samples 12A-12H is noted below in Table 13.

TABLE 11

Formulation for Samples 12A-12H.

| Component | Amount |
|---|---|
| Polypropylene homopolymer | 995.5 g |
| Primary antioxidant (Irganox ® 1010) | 0.5 g |
| Secondary antioxidant (Irgafos ® 168) | 1.0 g |
| Zinc stearate acid scavenger | 1.0 g |
| Nucleating agent | 2.0 g |

TABLE 12

Formulation for Comparative Example 18.

| Component | Amount |
|---|---|
| Polypropylene homopolymer | 997.5 g |
| Primary antioxidant (Irganox ® 1010) | 0.5 g |
| Secondary antioxidant (Irgafos ® 168) | 1.0 g |
| Zinc stearate acid scavenger | 1.0 g |

Each of the polypropylene homopolymer compositions was compounded by blending the components in a Henschel high intensity mixer for approximately two minutes at a blade speed of approximately 2100 rpm. The samples were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polypropylene homopolymer composition was cooled in a water bath and subsequently pelletized.

The polypropylene homopolymer compositions were formed into plaques using the general procedure set forth in Example 8. The plaques measured approximately 76 mm long, approximately 51 mm wide, and approximately 1.3 mm thick.

The isothermal crystallization half time (ICHT) for each of the polypropylene homopolymer compositions was measured at a temperature of approximately 135° C. using a differential scanning calorimeter (Mettler-Toledo DSC822 differential scanning calorimeter). The result of the ICHT measurement for each of the polypropylene homopolymer compositions is set forth in Table 13 below.

TABLE 13

Isothermal crystallization half times for Samples 12A-12H and Comparative Example 18.

| Sample | Nucleating Agent | ICHT (min) |
|---|---|---|
| Comp. Ex. 18 | None | 10.69 |
| 12A | calcium phenylphosphonate monohydrate | 1.57 |
| 12B | zinc phenylphosphonate | 1.07 |
| 12C | zirconium phenylphosphonate | 8.9 |
| 12D | calcium (4-propylphenyl)phosphonate | 2.46 |
| 12E | zinc (3-fluorophenyl)phosphonate | 1.68 |
| 12F | calcium (4-chlorophenyl)phosphonate | 4.67 |
| 12G | calcium (4-tert-butylphenyl)phosphonate | 0.77 |
| 12H | zinc (3,4-dimethylphenyl)phosphonate | 1.03 |

As can be seen from the data set forth in Table 13, the polypropylene homopolymer compositions according to the invention exhibited reduced isothermal crystallization half times relative to the control. Indeed, many of the inventive polypropylene homopolymer compositions exhibited isothermal crystallization half times that were less than 50% of the isothermal crystallization half time exhibited by the control (i.e., Comparative Example 18). It is believed that these reduced isothermal crystallization half times indicate that the inventive polypropylene homopolymer compositions can be processed using reduced cycle times relative to the comparative polypropylene homopolymer composition.

EXAMPLE 13

This example demonstrates a method for producing a thermoplastic article in accordance with the invention. Two ten kilogram batches of polypropylene random copolymer compositions (Sample 13 and Comparative Example 19) were compounded in accordance with the formulations set forth in Tables 14 and 15 below. Sample 13 was made using a calcium phenylphosphonate monohydrate nucleating agent such as that described above, and Comparative Example 19 was made using an aluminum 2,2'-methylenebis(4,6-di-tert-butylphenyl)phosphate nucleating agent (NA-21 from Adeka Corporation).

TABLE 14

Formulation for Sample 13.

| Component | Amount |
|---|---|
| Polypropylene random copolymer | 9970 g |
| Zinc stearate acid scavenger | 10.0 g |
| Calcium phenylphosphonate monohydrate | 20.0 g |

TABLE 15

Formulation for Comparative Example 19.

| Component | Amount |
|---|---|
| Polypropylene random copolymer | 9972 g |
| Calcium stearate acid scavenger | 8.0 g |
| NA-21 nucleating agent | 20.0 g |

Each of the polypropylene random copolymer compositions was compounded by blending the components in a Henschel high intensity mixer for approximately two minutes at a blade speed of approximately 2100 rpm. The samples were then melt compounded on a Leistritz Micro 27 GL/40D co-rotating, fully intermeshing, parallel, twin-screw extruder with a 27 mm screw diameter and a length/diameter ratio of 40:1. The barrel temperature of the extruder was ramped from approximately 195° C. to approximately 215° C., and the screw speed was set at approximately 500 rpm. The extrudate (in the form of a strand) for each polypropylene homopolymer composition was cooled in a water bath and subsequently pelletized.

Each of the polypropylene random copolymer compositions was used to produce 500 mL bottles on a Bekum H-121S single-station extrusion blow-molding machine. The blow-molding machine had a 50 mm screw diameter, a length/diameter ratio of 24:1, and a smooth barrel. The barrel temperature of the extruder was approximately 202° C., and the extrusion head was maintained at a temperature of approximately 202° C. The molten polymer parison was extruded into a blow mold that was maintained at a mold temperature of approximately 18° C. The final polypropylene bottle weighed approximately 32 g and measured approximately 0.76 mm in thickness. The bottles produced were then tested as described below.

The percent haze for the side wall of the bottles was measured in accordance with ASTM Standard D1003-92 using a BYK-Gardner Haze-Gard Plus. The gloss of both the inside and outside of the bottle side wall was measured in accordance with ASTM Standard D523 using a BYK-Gardner micro-TRI-gloss 4520 at an angle of 60°. The measured percent haze and gloss values for the bottles are set forth in Table 16 below.

The top load strength (reported as peak load) of the bottles was tested in accordance with ASTM Standard D2659 using an MTS Q-Test/5 instrument with a fixed crosshead speed of 50.0 mm/minute. The measurements for the bottles are set forth in Table 16 below.

TABLE 16

Physical properties for bottles made from Sample 13 and Comparative Example 19.

| | Sample 13 | Comparative Example 19 |
|---|---|---|
| Inside Gloss (%) | 124.2 | 118.2 |
| Outside Gloss (%) | 123.3 | 117.8 |
| Haze (%) | 15.2 | 16.4 |
| Top load strength (N) | 593.8 | 540.6 |

As can be seen from the data set forth in Table 16, the polypropylene random copolymer composition of the invention produces extrusion blow molded bottles exhibiting higher gloss, lower haze, and higher top load strength than blow molded bottles produced using a different, commercially-available nucleating agent (i.e., NA-21 from Adeka Corporation).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A composition comprising:
   (a) a polyolefin selected from the group consisting of polypropylene homopolymers, polypropylene copolymers, polyethylene, polyethylene copolymers, polybutylene, poly(4-methyl-1-pentene) and mixtures thereof, and
   (b) a nucleating agent comprising a metal salt of a phenylphosphonic acid, the nucleating agent comprising primary particles having a mean aspect ratio of about two or more.

2. The composition of claim 1, wherein the mean aspect ratio of the primary particles is about five or more.

3. The composition of claim 1, wherein the polyolefin is selected from the group consisting of polypropylene homopolymers, polypropylene copolymers, and mixtures thereof.

4. The composition of claim 1, wherein the metal salt of the phenylphosphonic acid conforms to the structure of Formula (II) below:

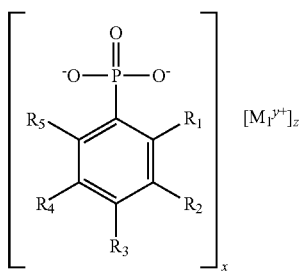

wherein x is a positive integer; $R_1$, $R_2$, $R_3$, $R_4$, and $R_5$ are substituents independently selected from the group consisting of hydrogen, $C_1$-$C_8$ alkyl groups, $C_1$-$C_8$ alkoxy groups, aryl groups, and halogens; z is a positive integer; each $M_1$ is a metal cation; y is the valence of the metal cation $M_1$; and the values of x, y, and z satisfy the following equation $2x=yz$.

5. The composition of claim 4, wherein each $M_1$ is a metal cation independently selected from the group consisting of alkali metal cations, alkaline earth metal cations, transition metal cations, lanthanide cations, and poor metal cations.

6. The composition of claim 4, wherein x is 1; $R_1$, $R_2$, $R_3$, $R_4$, and $R_5$ are each hydrogen; z is 1; and $M_1$ is a calcium cation.

7. The composition of claim 1, wherein the metal salt of the phenylphosphonic acid is a dehydrate.

8. A composition comprising:
   (a) a polyolefin selected from the group consisting of polypropylene homopolymers, polypropylene copolymers, polyethylene, polyethylene copolymers, polybutylene, poly(4-methyl-1-pentene) and mixtures thereof,
   (b) a nucleating agent comprising a metal salt of a phenylphosphonic acid, the nucleating agent comprising primary particles having a mean aspect ratio of about two or more, and
   (c) an acid scavenger selected from the group consisting of metal salts of stearic acid.

9. The composition of claim 8, wherein the metal salt of the phenylphosphonic acid conforms to the structure of Formula (II) below:

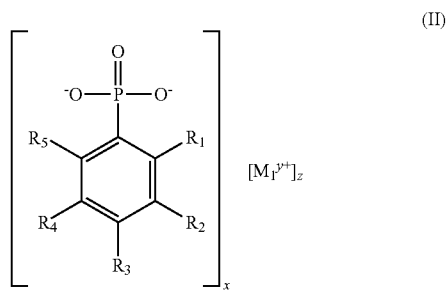

wherein x is a positive integer; $R_1$, $R_2$, $R_3$, $R_4$, and $R_5$ are substituents independently selected from the group consisting of hydrogen, $C_1$-$C_8$ alkyl groups, $C_1$-$C_8$ alkoxy groups, aryl groups, and halogens; z is a positive integer; each $M_1$ is a metal cation; y is the valence of the metal cation $M_1$; and the values of x, y, and z satisfy the following equation $2x=yz$.

10. The composition of claim 9, wherein each $M_1$ is a metal cation independently selected from the group consisting of alkali metal cations, alkaline earth metal cations, transition metal cations, lanthanide cations, and poor metal cations.

11. The composition of claim 8, wherein the acid scavenger is selected from the group consisting of calcium stearate, zinc stearate, magnesium stearate, and mixtures thereof.

12. The composition of claim 9, wherein x is one, $M_1$ is a calcium cation, and z is one.

13. The composition of claim 8, wherein the polyolefin is selected from the group consisting of polypropylene homopolymers, polypropylene copolymers, and mixtures thereof.

14. A method for producing a thermoplastic article, the method comprising the steps of:
   (a) providing a thermoplastic composition comprising a thermoplastic and a nucleating agent, the thermoplastic comprising a polyolefin selected from the group consisting of polypropylene homopolymers, polypropylene copolymers, polyethylene, polyethylene copolymers, polybutylene, poly(4-methyl-1-pentene) and mixtures thereof, and the nucleating agent comprising a metal salt of a phenylphosphonic acid, the nucleating agent comprising primary particles having a mean aspect ratio of about two or more,
(b) heating the thermoplastic composition to a temperature sufficient to melt the thermoplastic composition,
(c) extruding the thermoplastic composition into a sheet,
(d) cooling the sheet produced in step (c) to a temperature sufficient to at least partially solidify the thermoplastic composition,
(e) optionally, reheating the sheet to a temperature sufficient to soften the thermoplastic composition,
(f) placing the sheet onto a mold having a shape, the shape defining at least a portion of the thermoplastic article,
(g) subjecting the sheet to one or more forces sufficient to cause the sheet to conform to the shape of the mold, and
(h) cooling the sheet to a temperature sufficient to solidify the thermoplastic composition.

15. The method of claim 14, wherein the metal salt of the phenylphosphonic acid conforms to the structure of Formula (II) below:

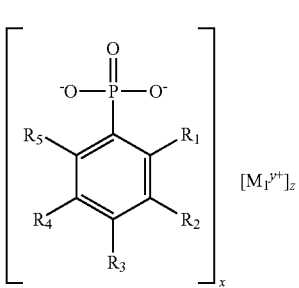

wherein x is a positive integer; $R_1$, $R_2$, $R_3$, $R_4$, and $R_5$ are substituents independently selected from the group consisting of hydrogen, $C_1$-$C_8$ alkyl groups, $C_1$-$C_8$ alkoxy groups, aryl groups, and halogens; z is a positive integer; each $M_1$ is a metal cation; y is the valence of the metal cation $M_1$; and the values of x, y, and z satisfy the following equation $2x=yz$.

16. The method of claim 15, wherein each $M_1$ is a metal cation independently selected from the group consisting of alkali metal cations, alkaline earth metal cations, transition metal cations, lanthanide cations, and poor metal cations.

17. A method for producing a thermoplastic article, the method comprising the steps of:

(a) providing a thermoplastic composition comprising a thermoplastic and a nucleating agent, the thermoplastic comprising a polyolefin selected from the group consisting of polypropylene homopolymers, polypropylene copolymers, polyethylene, polyethylene copolymers, polybutylene, poly(4-methyl-1-pentene) and mixtures thereof, and the nucleating agent comprising a metal salt of a phenylphosphonic acid, the nucleating agent comprising primary particles having a mean aspect ratio of about two or more,
(b) providing an injection molding apparatus, the injection molding apparatus comprising a mold cavity, the mold cavity defining at least a portion of the thermoplastic article,
(c) heating the thermoplastic composition to a temperature sufficient to melt the thermoplastic composition,
(d) injecting the thermoplastic composition into the mold cavity,
(e) cooling the thermoplastic composition to a temperature sufficient to at least partially solidify the thermoplastic composition, and
(f) removing the resulting thermoplastic article from the mold cavity.

18. The method of claim 17, wherein the metal salt of the phenylphosphonic acid conforms to the structure of Formula (II) below:

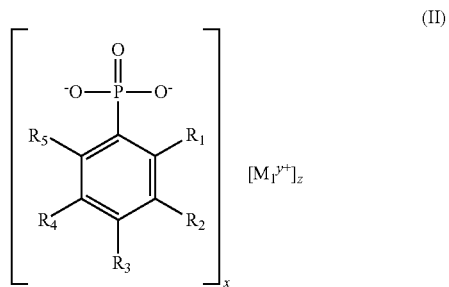

wherein x is a positive integer; $R_1$, $R_2$, $R_3$, $R_4$, and $R_5$ are substituents independently selected from the group consisting of hydrogen, $C_1$-$C_8$ alkyl groups, $C_1$-$C_8$ alkoxy groups, aryl groups, and halogens; z is a positive integer; each $M_1$ is a metal cation; y is the valence of the metal cation $M_1$; and the values of x, y, and z satisfy the following equation $2x=yz$.

19. The method of claim 18, wherein each $M_1$ is a metal cation independently selected from the group consisting of alkali metal cations, alkaline earth metal cations, transition metal cations, lanthanide cations, and poor metal cations.

* * * * *